(12) United States Patent
Hsu et al.

(10) Patent No.: US 11,388,573 B1
(45) Date of Patent: Jul. 12, 2022

(54) ENHANCED NEAR-FIELD COMMUNICATIONS FOR WIRELESS DEVICES

(71) Applicant: Amazon Technologies, Inc., Seattle, WA (US)

(72) Inventors: Morris Yuanhsiang Hsu, Mountain View, CA (US); In Chul Hyun, Saratoga, CA (US); Naman B. Barmecha, Newark, CA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 16/865,117

(22) Filed: May 1, 2020

(51) Int. Cl.
*H04B 7/00* (2006.01)
*H04W 4/80* (2018.01)
*H04B 5/02* (2006.01)
*G06Q 20/32* (2012.01)

(52) U.S. Cl.
CPC ............... *H04W 4/80* (2018.02); *H04B 5/02* (2013.01); *G06Q 20/3278* (2013.01)

(58) Field of Classification Search
CPC ........ H04W 4/80; H04B 5/02; G06Q 20/3278
USPC ......................................................... 455/41.1
See application file for complete search history.

(56) References Cited

U.S. PATENT DOCUMENTS

| | | | |
|---|---|---|---|
| 8,905,317 B1* | 12/2014 | Hsu ...................... | H01Q 1/2225 235/487 |
| 9,396,368 B1* | 7/2016 | Lamba ................... | H04B 1/401 |
| 9,484,631 B1* | 11/2016 | Napoles ................. | H01Q 5/378 |
| 9,529,758 B1* | 12/2016 | Szeto ..................... | G06F 13/364 |
| 9,641,205 B1* | 5/2017 | Hyun .................... | H04B 1/0475 |
| 10,140,604 B1* | 11/2018 | Douthat ................. | G06F 1/329 |
| 10,182,328 B1* | 1/2019 | Maibach ............... | G07F 19/209 |
| 10,410,202 B1* | 9/2019 | Ng ............... | G06F 1/30 |
| 10,476,569 B1* | 11/2019 | Hsu .................... | H04W 72/1263 |
| 10,579,566 B2* | 3/2020 | Douthat .............. | G06F 13/4022 |
| 10,581,155 B1* | 3/2020 | Gradinaru ............. | H04B 1/109 |
| 10,643,200 B2* | 5/2020 | Dorsey ................ | G06Q 20/347 |
| 10,810,570 B1* | 10/2020 | Martin ............... | G06Q 20/3278 |
| 10,970,698 B1* | 4/2021 | Binder ..................... | G07G 1/01 |
| 2004/0088449 A1* | 5/2004 | Sakaki .................. | G06F 13/385 710/15 |
| 2010/0045441 A1* | 2/2010 | Hirsch ................. | H04B 5/0012 455/41.1 |
| 2011/0312271 A1* | 12/2011 | Ma ...................... | G06K 7/10237 455/41.1 |
| 2014/0220885 A1* | 8/2014 | Chou ...................... | H04W 4/80 455/41.1 |

(Continued)

*Primary Examiner* — April G Gonzales
(74) *Attorney, Agent, or Firm* — Eversheds Sutherland (US) LLP

(57) ABSTRACT

Devices, systems, and methods are provided for enhanced near-field communications for wireless devices. A processor of a first device may send a first Bluetooth communication at a first signal strength. The processor may receive a first indication of activity associated with a near field communication (NFC) device of the first device, wherein the processor and the NFC device are collocated on the first device. The processor may determine a second signal strength associated with a second Bluetooth communication, the second signal strength less than the first signal strength. The processor may receive a second indication that the activity associated with the NFC device has concluded. The processor may decrease a power supplied to the NFC device.

20 Claims, 9 Drawing Sheets

(56) References Cited

U.S. PATENT DOCUMENTS

| | | | |
|---|---|---|---|
| 2016/0314700 A1* | 10/2016 | Butler | G09B 5/125 |
| 2019/0164165 A1* | 5/2019 | Ithabathula | G06F 21/34 |
| 2021/0150158 A1* | 5/2021 | Patwardhan | G06K 7/10297 |
| 2021/0182442 A1* | 6/2021 | Slaney | G07G 3/006 |
| 2021/0185802 A1* | 6/2021 | Slaney | H04W 4/80 |

* cited by examiner

ENHANCED NEAR-FIELD COMMUNICATIONS FOR WIRELESS DEVICES

BACKGROUND

People increasingly are using wireless devices to perform tasks. Devices may communicate wirelessly using a variety of techniques, and may require multiple types of communication hardware. As devices become smaller and communicate wirelessly with a variety of other devices, there is a need to enhance communications by facilitating a coexistence of hardware used by multiple communication protocols on a same device.

Figure 1:
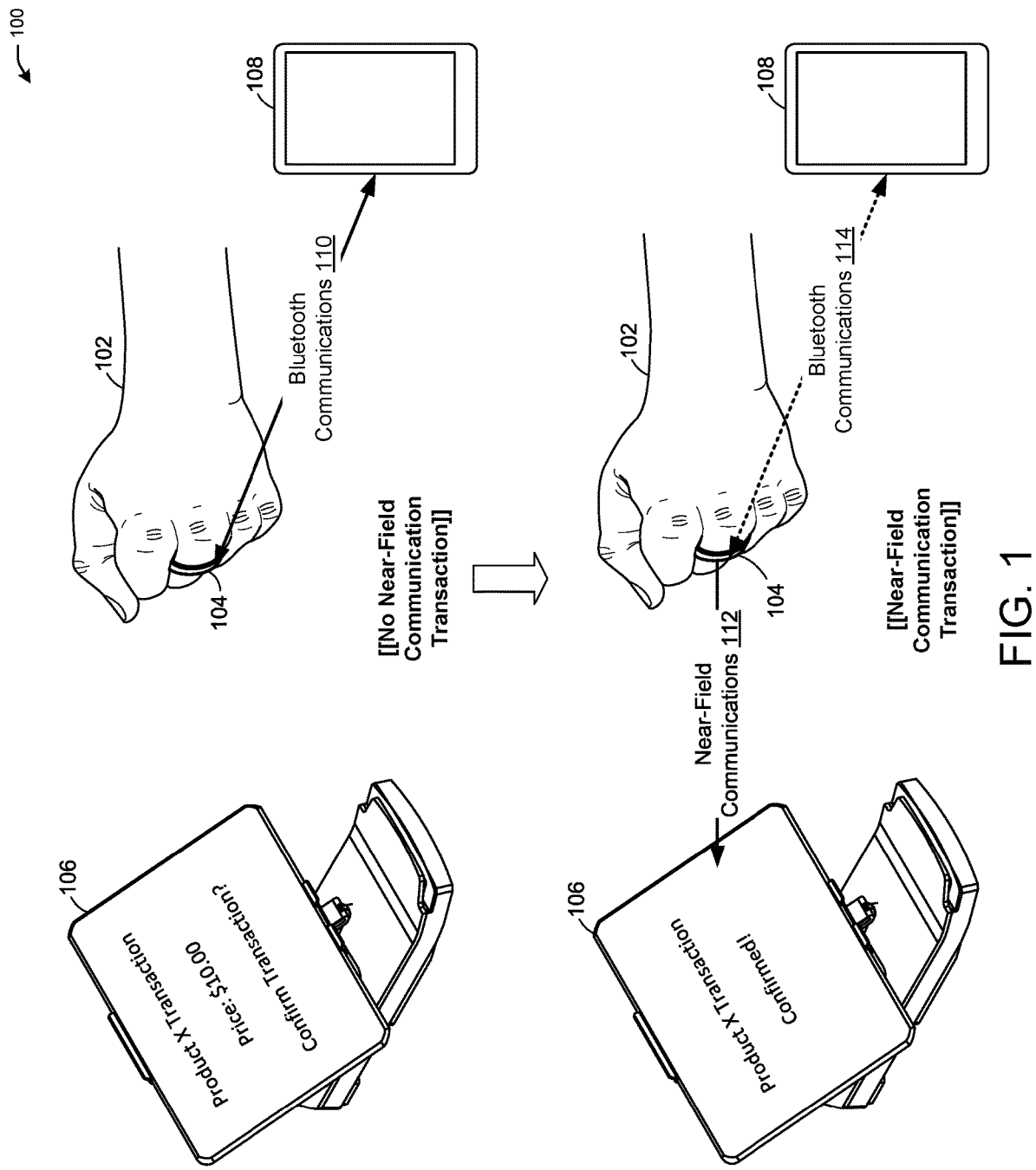
FIG. 1 illustrates an example process for using enhanced near-field communications for wireless devices, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for using enhanced near-field communications for wireless devices.

Devices increasingly are using multiple wireless communication protocols, such as Wi-Fi, Bluetooth, near-field communications (NFC), and the like, to communicate with other devices. For example, wireless communication protocols may allow devices to communicate with one another, such as to conduct phone calls, send messages or other content, and to conduct transactions. Bluetooth and NFC protocols may facilitate device communications at close distances. For example, NFC may be used to facilitate financial transactions due to its short range and encryption capabilities (e.g., to avoid the risk of any wireless transmission being intercepted). A wireless device such as a smartphone or wearable device (e.g., a ring or wrist watch) may be used to make a payment for a product by being held close to another wireless device (e.g., a point-of-sale device). Encrypted radio waves sent between the wireless devices over a particular frequency (e.g., encrypted payment information such as a credit card or bank account number) may be sent from one wireless device to another wireless device using NFC, allowing the other wireless device to process a payment using the transmitted information.

While NFC may be useful in some applications, NFC may not be suitable for other applications, such as applications requiring longer transmission range or other frequency bands. Wireless devices may benefit from having both NFC capability and other types of communication capability. Some communications protocols are facilitated by different hardware. For example, wireless devices may have one chip for NFC, and another chip for Bluetooth or Wi-Fi. Fabrication of smaller devices having hardware that supports multiple communications protocols may result in chips and/or antennae supporting different communication protocols to be placed in close proximity to one another. The close proximity of multiple communication devices on a wireless device may result in interference, insufficient antenna gain, and latency (e.g., when a device needs to delay one form of communication to allow for another form of communication at a given time).

Another challenge with devices having collocated radios using different wireless communication protocols is battery reliability. For example, the concurrent use of multiple communication protocols on a device may require significant draw of current from a battery, which can result in a brownout.

NFC may be active or passive. Active NFC refers to an ability to both send and receive data using NFC. Passive NFC refers to an ability to send data using NFC, but not to receive data using NFC. Active NFC may be preferable for some wireless device applications (e.g., payment transactions using NFC), but may require a significant amount of current for operations. Load modulation may allow a tag device to send data to a reader device using NFC. In passive load modulation, the tag device may act as a standard radio-frequency integrated circuit (RFIC). The NFC reader device may emit a wave magnetic field. The tag device may rectify the incident wave to provide power to its electrical components, and may modify its impedance based on data stored in its memory. The reader device may monitor the amplitude variation of the wave to read the data being sent. Because passive load modulation tag devices may need to harvest sufficient power from the magnetic field, the tag devices may need a sufficient coupling coefficient with a reader antenna and a high-quality factor on its antenna to allow for sufficient range. Active load modulation may use a driver to directly modulate an incoming wave. Because the driver may require power supply, active load modulation may power electronics directly from a device battery. Smaller devices with smaller batteries may experience brownouts due to current spikes caused by the use of active NFC, in particular when used concurrently with other wireless communication protocols on the same device.

Some devices may support switching between multiple cards (e.g., chips supporting different types of communications), and may use a microcontroller unit (MCU). For example, a MCU may have built-in wireless communication capability for Wi-Fi and/or Bluetooth, so to implement NFC on a device with such a MCU, the NFC hardware may have a connection with the MCU. Use of the MCU and NFC on a device may result in brownouts.

There is therefore a need to facilitate the use of collocated radios on wireless devices without risk of brownouts.

In one or more embodiments, a wireless device such as a smartphone or wearable device may have hardware that facilitates multiple wireless communications protocols. For example, the wireless device may include a combination of Wi-Fi hardware, Bluetooth hardware, and NFC hardware. To allow for active NFC on such a device without risk of brownouts, communications may be enhanced by coordinating the use of hardware for different communication protocols. For example, a device may implement power rail voltage optimization and damping to reduce peak current draw from a battery of a device using hardware to support multiple wireless communication protocols. An RC circuit may be used for damping, for example. A larger external antenna may be included on the device, trading peak additional current consumption with implementation complexity. To minimize the complexity, an external (e.g., external to a NFC chip) NFC antenna may be positioned near or next to a Bluetooth antenna so that the two sets of antennae may sit on a same carrier. Using the external NFC antenna may reduce the amplitude of peak current draw while improving NFC reading range of the device.

In one or more embodiments, a wireless device may include a MCU with Bluetooth capability, and a separate chip with NFC capability. The NFC chip may include a switch that gates a secure element power supply from the drain power voltage (VDD). The secure element may be powered when an external field is detected or when the MCU enables the secure element for programming and/or selecting chips. The secure element may be leveraged as an interrupt to indicate when the wireless device is in the presence of an external reader, thereby facilitating a coexistence scheme for NFC and Bluetooth communications. When the MCU receives the interrupt indication, the MCU may reduce Bluetooth transmit power during an entire NFC transaction, lower a system reset power source voltage level of the MCU for the entire NFC transaction, or may blank Bluetooth transmissions only during NFC current peaks. Once a NFC transactions is complete, the MCU may disable the NFC chip. For example, when the NFC chip indicates that the device has been removed from an external field, the MCU may disable power supply to the NFC chip or may set the NFC chip to a power-down mode and terminate the coexistence scheme. The NFC chip may communicate (e.g., using an interface for the MCU and NFC chip) that a transaction has completed, or the MCU may detect the end of a transaction based on a voltage reading of the NFC chip.

In one or more embodiments, to reduce Bluetooth transmit power for a full NFC transaction, the MCU may configure Bluetooth transmit power for a next packet. There may be a time between the secure element being enabled and a first high current peak of the NFC device when at close range to another device (e.g., a point-of-sale). When the Bluetooth transmit power is reduced, the Bluetooth current peak may be reduced.

In one or more embodiments, during the few seconds of concurrent Bluetooth and NFC operations, the MCU may change its system shutdown voltage to accommodate concurrent spikes. In this manner, some Bluetooth transmissions may be allowed to occur during a concurrent spike.

In one or more embodiments, to blank Bluetooth transmissions, the MCU may use an analog-to-digital converter (ADC) to sample the voltage drop across a dampening resistor on the NFC supply line. When an NFC current spike is detected based on the ADC reading, the MCU may blank Bluetooth transmissions until the ADC reading indicates that the NFC transaction has concluded.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for using enhanced near-field communications for wireless devices, in accordance with one or more example embodiments of the present disclosure.

Figure 6:
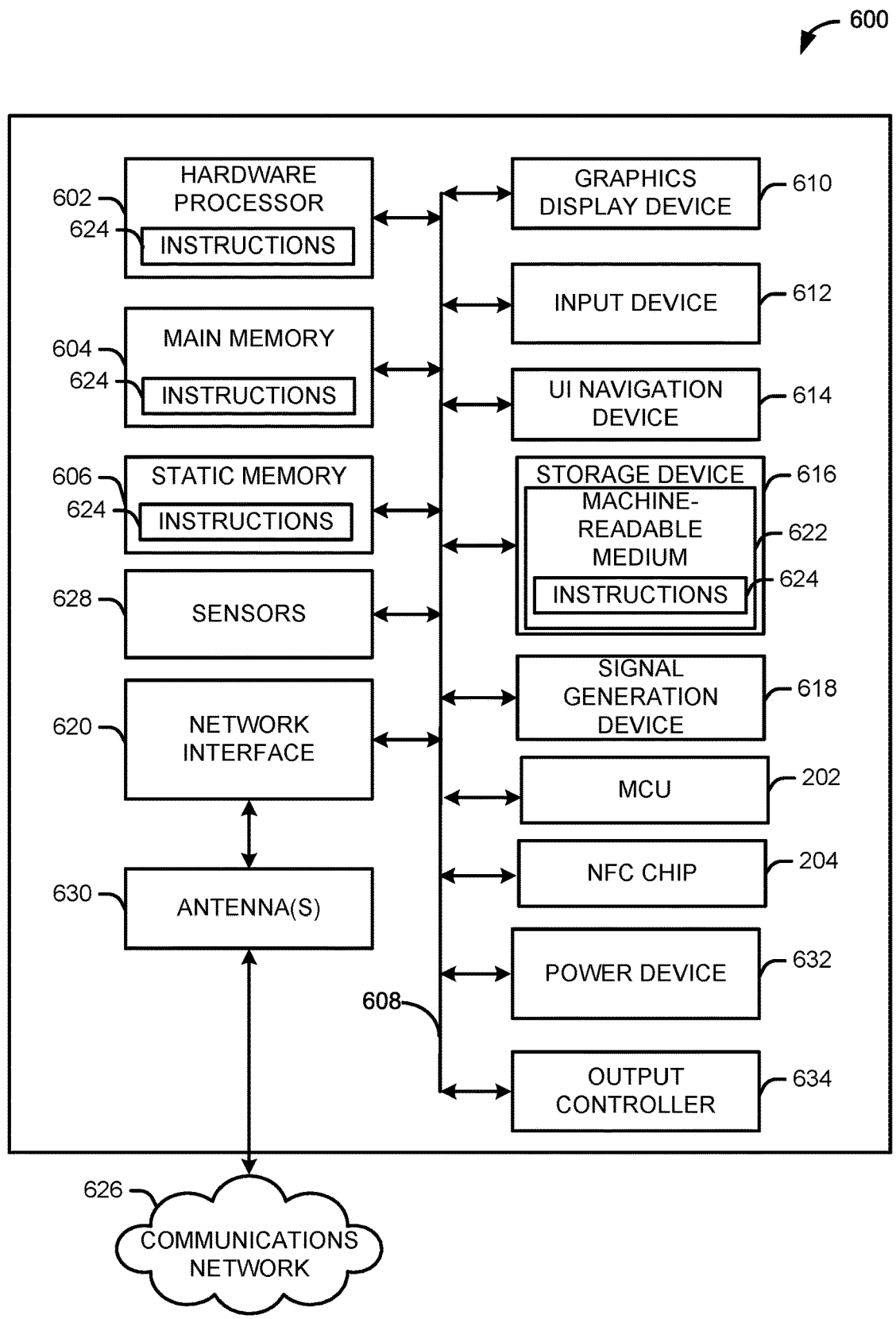
FIG. 6 illustrates a block diagram of an example machine upon which any of one or more techniques (e.g., methods) may be performed, in accordance with one or more example embodiments of the present disclosure.

Referring to FIG. 1, the process 100 may include a user (e.g., a hand 102 of the user) wearing or holding a device 104 (e.g., ring, watch, smart phone, etc.). The device 104 may have NFC capability to facilitate a transaction with a payment device 106 (e.g., a point-of-sale device), and may communicate with a device 108 using Bluetooth communications 110. As the device 104 approaches the payment device 106 and detects an electromagnetic field (not shown) produced by the payment device 106, the device 104 may attempt to send near-field communications (e.g., payment data) to the payment device 106 to facilitate a transaction (e.g., a purchase of Product X). However, due to the concurrent Bluetooth operations of the device 104 (e.g., the Bluetooth communications 110 with the device 108), the device 104 may be unable to use near-field communications to facilitate the transaction with the payment device 106. For example, near-field communications in addition to the Bluetooth communications may require too much current draw (e.g., from a battery of the device 104, such as shown in FIG. 6), and may result in a brownout.

Still referring to FIG. 1, the device 104 may use enhanced NFC to facilitate the NFC transaction with the payment device 106. For example, the device may send near-field communications 112 to the payment device 106. The near-field communications 112 may include payment data, such as an account or credit card information used to conduct a transaction facilitated by the payment device 106. In this manner, the device 104 may send the near-field communications 112 without making contact with the payment device 106. To allow for the near-field communications 112 without risking a brownout, the device 104 may use reduced power Bluetooth communications 114 (e.g., compared to the Bluetooth communications 110), may blank the Bluetooth communications 110, or may lower a system reset power source voltage level of the device 104 as explained further below. In this manner, the device 104 may collaborate the use of NFC and Bluetooth communications to ensure that current drawn by the different communication techniques does not cause a brownout on the device 104.

In one or more embodiments, while the payment device 106 is shown as facilitating a transaction (e.g., for Product X), the payment device 106 may be any type of wireless device that supports NFC, and the near-field communications 112 may include any data that is sent using NFC protocol when the device 104 is close enough to the payment device 106 to sense an electromagnetic field from the payment device 106.

In one or more embodiments, the device 104, the payment device 106, and/or the device 108 may include a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2:
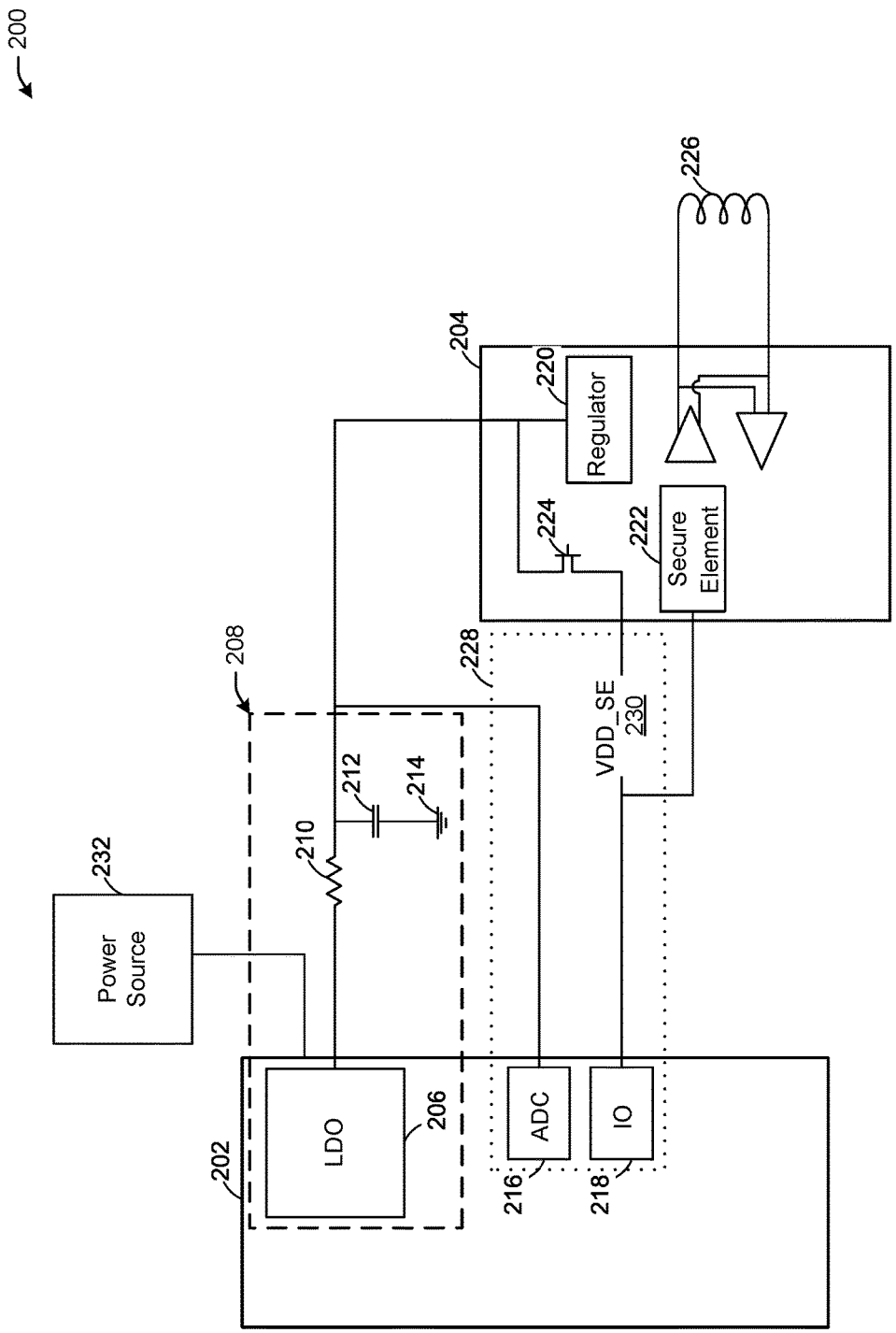
FIG. 2 illustrates an example schematic diagram for collocated communication devices used in enhanced near-field communications for wireless devices, in accordance with one or more example embodiments of the present disclosure.

FIG. 2 illustrates an example schematic diagram 200 for collocated communication devices used in enhanced near-field communications for wireless devices, in accordance with one or more example embodiments of the present disclosure.

Referring to FIG. 2, the schematic diagram 200 may be implemented in any wireless device, such as the device 104 of FIG. 1. For example, a wireless device such as the device 104 of FIG. 1 may include a MCU 202 that supports non-NFC communications, such as Bluetooth or Wi-Fi (e.g., for communications with the device 108 of FIG. 1). The wireless device may include a NFC chip 204 collocated with the MCU 202 and capable of performing NFC (e.g., sending the near-field communications 112, sending and/or receiving other near-field communications, etc.). The MCU 202 may have a low-dropout (LDO) device 206 (or the LDE device 206 may be external to the MCU 202), which may be operatively connected to a power rail voltage optimization and damping circuit 208, which may include an RC circuit (e.g., with resistor 210, capacitor 212, and ground 214). The MCU 202 may include ADC 216 and an input/output (IO) device 218. The NFC chip 204 may include a regulator 220, a secure element 222, a switch 224, and an external antenna 226. The ADC 216 and the IO device 218 may form a coexistence circuit 228 with the NFC chip 204. Power supply 230 from VDD may be gated by the switch 224. The schematic diagram 200 may include a power source 232 (e.g., a battery, converted power from a power receptacle, etc.).

In one or more embodiments, the secure element 222 may be powered only when an external field is detected by the NFC chip 204 or when the MCU 202 enables the secure element 222 for programming and/or selecting between the MCU 202 and the NFC chip 204. The VDD power supply 230 for the secure element 222 may be used by the MCU 202 and the NFC chip 204 as an interrupt to indicate the presence of an external reader (e.g., the payment device 106 of FIG. 1), and the MCU 202 may initiate a coexistence scheme upon detecting the interrupt.

In one or more embodiments, when the MCU 202 receives the interrupt (e.g., detects the power supply 230 to the secure element 222), the MCU 202 may reduce transmission power for Bluetooth or other communications protocols, thereby reducing current peak. For example, the Bluetooth communications 110 of FIG. 1 may be transmitted at a transmission power that is reduced for the Bluetooth communications 114 of FIG. 1.

In one or more embodiments, when the MCU 202 receives the interrupt (e.g., detects the power supply 230 to the secure element 222), the MCU 202 may reduce the system reset power source voltage level for a duration of an entire NFC transaction (e.g., the system reset power source voltage level for the power source 232). The MCU 202 may, during NFC operations (e.g., concurrent operations with Bluetooth or other communication protocol operations), change a system shutdown voltage to accommodate concurrent spikes caused by the concurrent operations. For example, a system shutdown voltage may be set to protect Bluetooth transmission performance, and may be reduced during NFC operations. In this manner, some Bluetooth packets may be corrupted when transmitted during NFC operations, but a Bluetooth link may be maintained.

In one or more embodiments, when the MCU 202 receives the interrupt (e.g., detects the power supply 230 to the secure element 222), the MCU 202 may blank one or more Bluetooth transmissions (e.g., the Bluetooth communications 110 of FIG. 1) during NFC current peaks (e.g., as explained further herein). The MCU 202 may use the ADC 216 to sample the voltage drop across the resistor 210. For example, the resistor 210 may be 4.7 ohms, and the peak current draw may be about 30 milliamps (mA). An NFC operation may use about 12 mA, thereby producing a delta of about 85 millivolts (mV). The ADC 216 may detect the delta. When the ADC 216 detects the current spike caused by NFC operations, the MCU 202 may blank one or more Bluetooth transmissions until the current spike is no longer detected.

In one or more embodiments, when the NFC chip 204 has completed NFC operations (e.g., is removed from an external field or the NFC chip 204 indicates to the MCU 202, using an interface such as the coexistence circuit 228, that NFC operations are complete), the MCU 202 may disable power supplied to NFC chip 204 (e.g., using the LDO device 206), or may set the NFC chip 204 to a power-down mode and may terminate the coexistence scheme.

In one or more embodiments, the coexistence circuit 228 may include logic providing an interface between the MCU 202 and the NFC chip 204 to enable use cases requiring NFC and Bluetooth coexistence.

In one or more embodiments, an operating system may be on the MCU 202 and may support Bluetooth, Wi-Fi, and/or other communication protocols. The NFC chip 204 may include the antenna 226, which may be dedicated antenna for NFC communications (e.g., the one or more near-field communications 112).

In one or more embodiments, the secure element 222 may be used to store information, such as payment information, user information, application information, and the like. The information stored in the secure element 222 may be used to conduct a NFC communication. For example, when the NFC chip 204 detects the presence of a field from another device (e.g., the payment device 106), the switch 224 may allow power to the secure element 222, and the NFC chip 204 may send (e.g., using the antenna 226) information stored in the secure element 222 as part of an NFC operation.

Figure 3A:
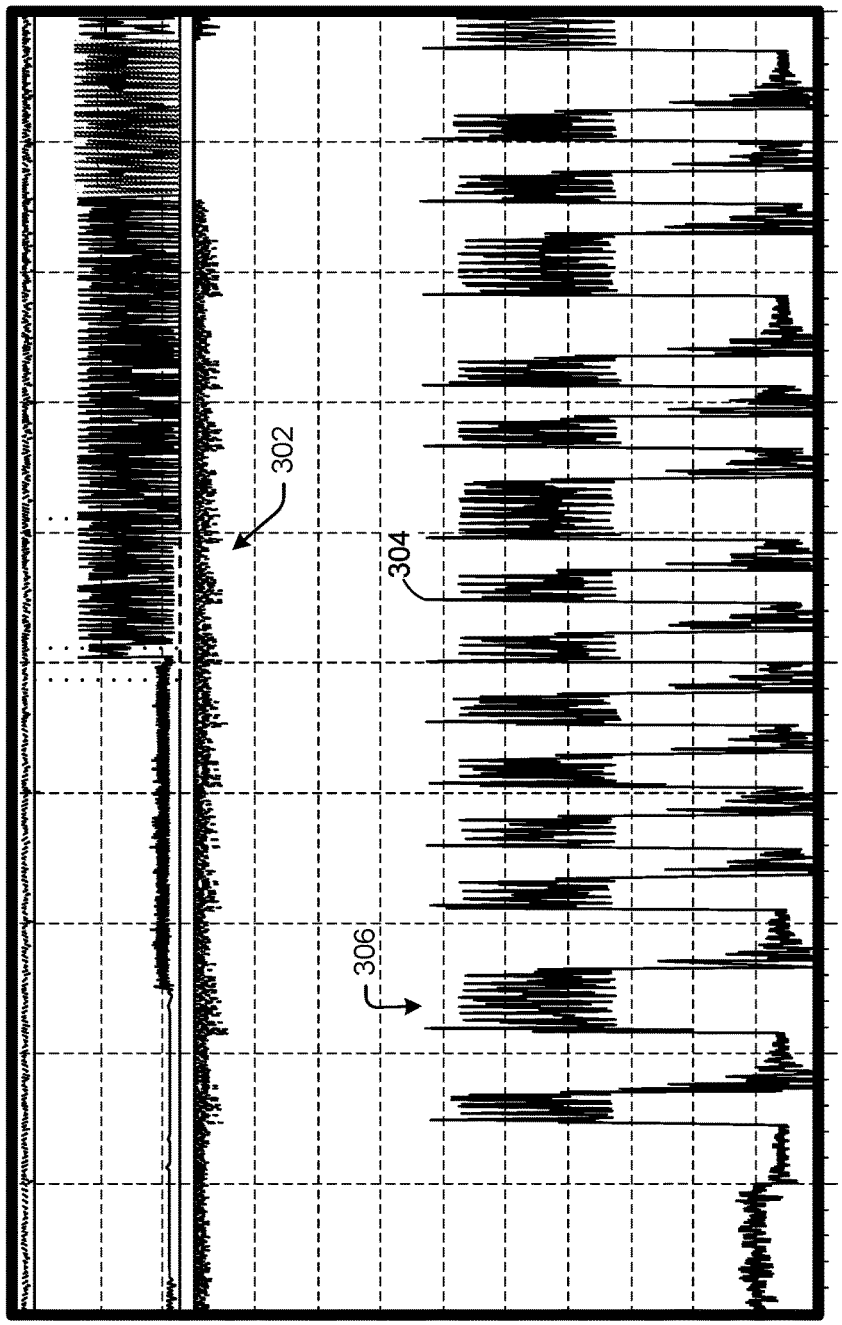
FIG. 3A illustrates an example graph for electrical current peak duration for enhanced near-field communications for wireless devices, in accordance with one or more example embodiments of the present disclosure.

FIG. 3A illustrates an example graph 300 for electrical current peak duration for enhanced near-field communications for wireless devices, in accordance with one or more example embodiments of the present disclosure.

Figure 3B:
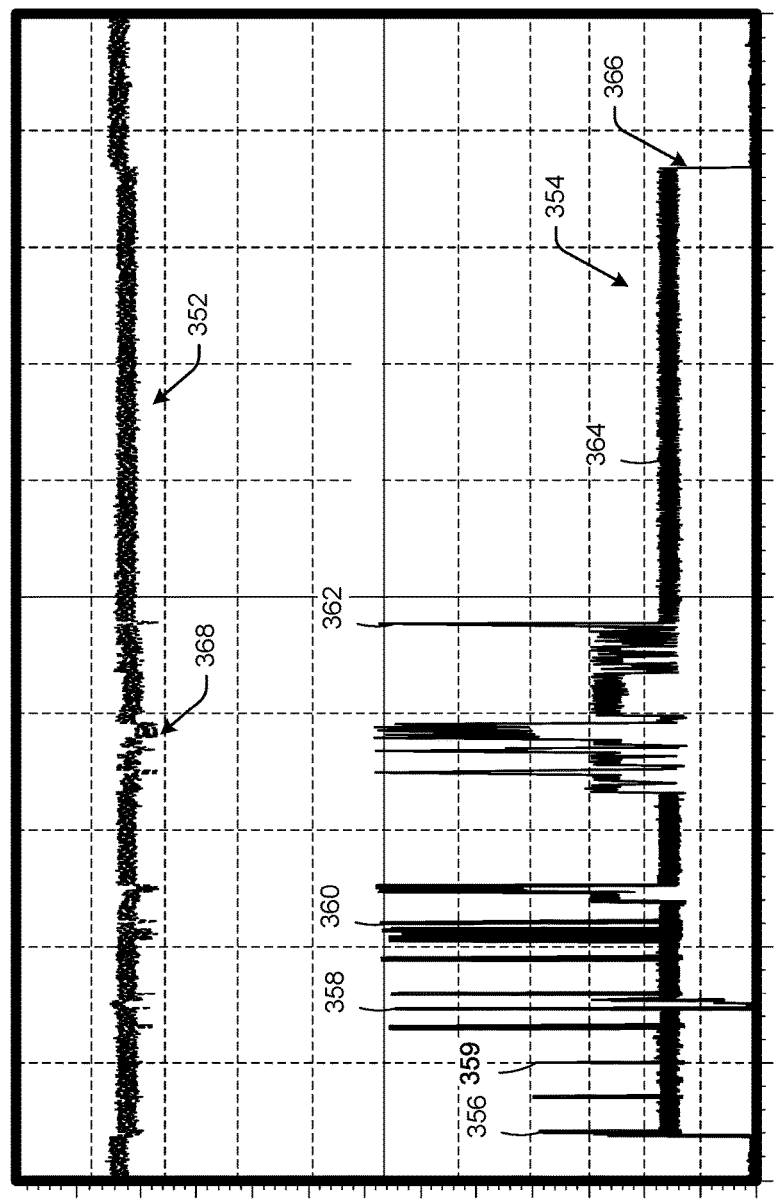
FIG. 3B illustrates an example graph for electrical current peak duration for enhanced near-field communications for wireless devices, in accordance with one or more example embodiments of the present disclosure.

FIG. 3B illustrates an example graph 350 for electrical current peak duration for enhanced near-field communications for wireless devices, in accordance with one or more example embodiments of the present disclosure.

Figure 4A:
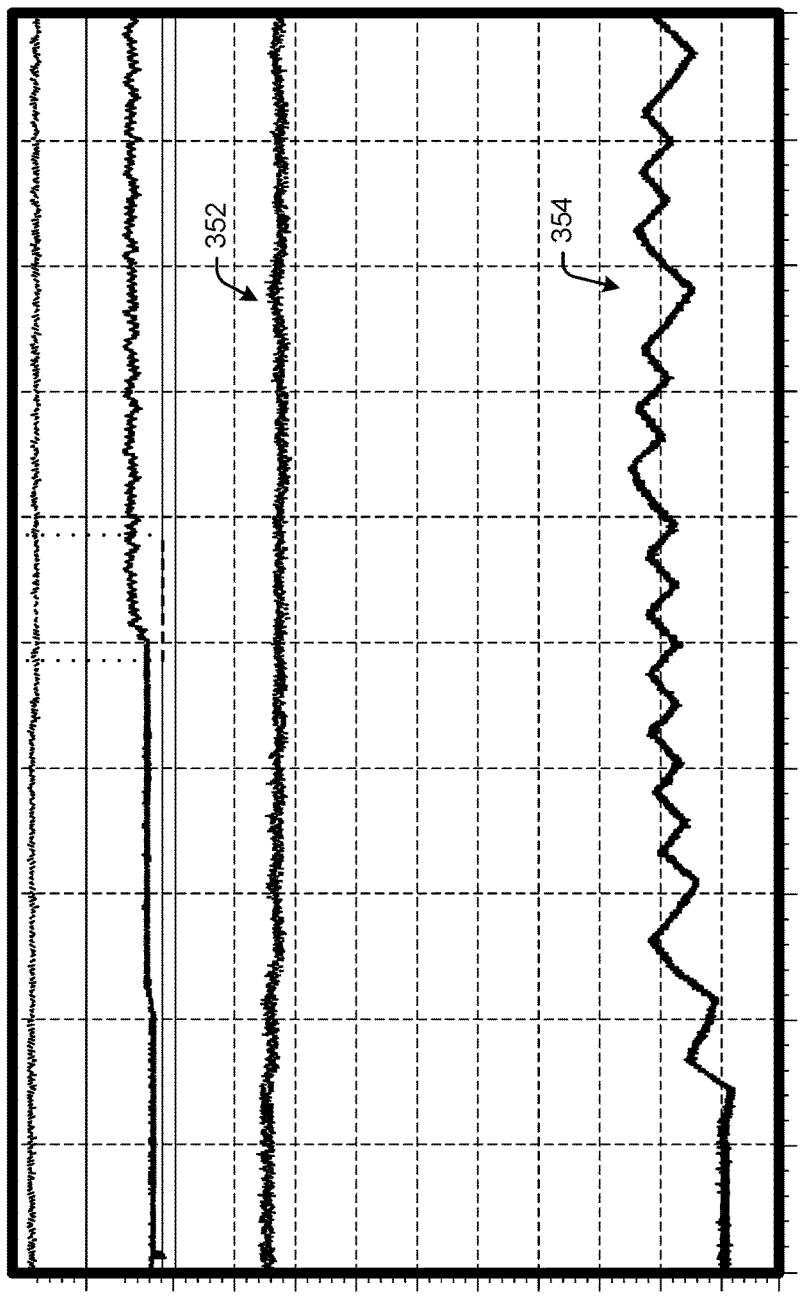
FIG. 4A illustrates an example graph for electrical current peak duration for enhanced near-field communications for wireless devices, in accordance with one or more example embodiments of the present disclosure.

FIG. 4A illustrates an example graph 400 for electrical current peak duration for enhanced near-field communications for wireless devices, in accordance with one or more example embodiments of the present disclosure.

Figure 4B:
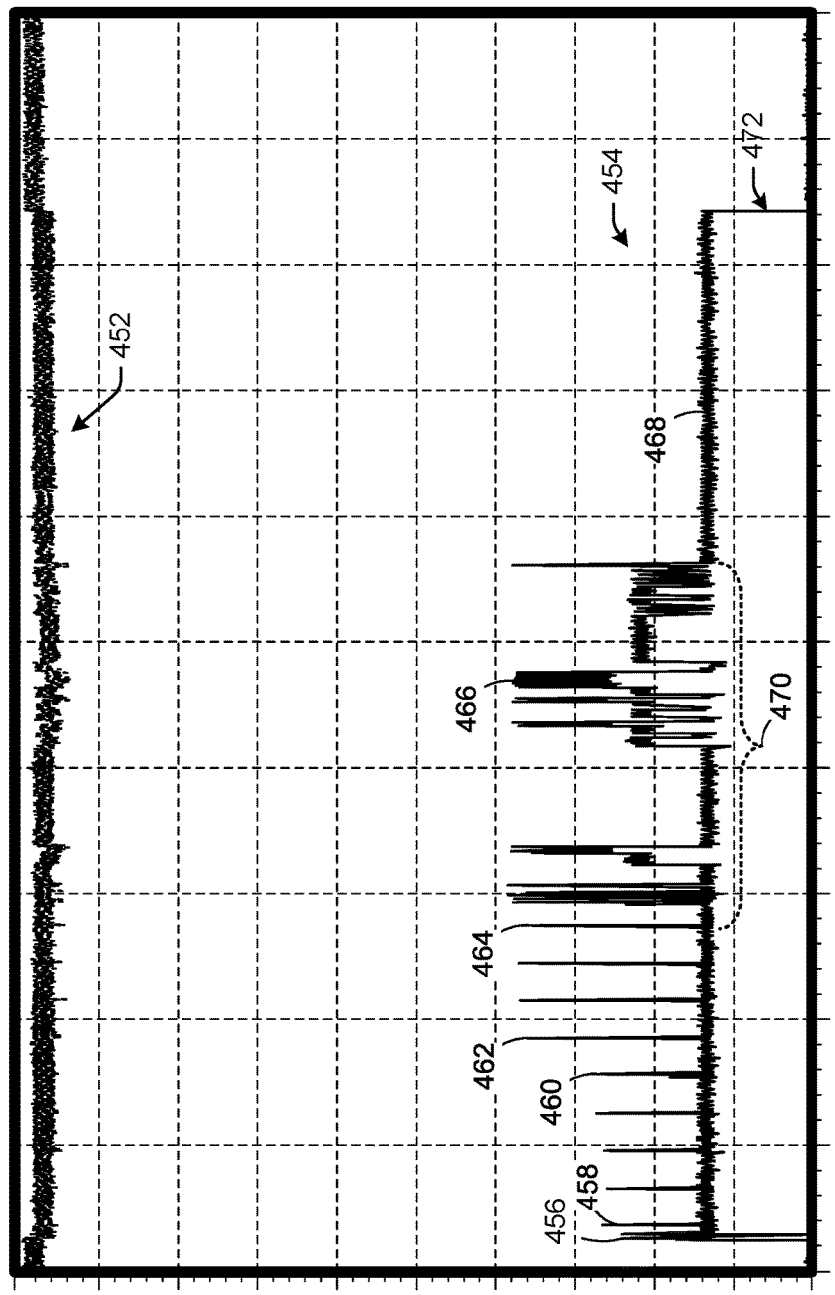
FIG. 4B illustrates an example graph for electrical current peak duration for enhanced near-field communications for wireless devices, in accordance with one or more example embodiments of the present disclosure.

FIG. 4B illustrates an example graph 450 for electrical current peak duration for enhanced near-field communications for wireless devices, in accordance with one or more example embodiments of the present disclosure.

Referring to FIG. 3A, FIG. 3B, FIG. 4A, and FIG. 4B, the current peak may refer to the current peak of a device (e.g., the device 104 of FIG. 1) capable of using NFC and another communication technique (e.g., Bluetooth or Wi-Fi).

Referring to FIG. 3A, the graph 300 shows electrical current peak duration. A supply voltage 302 is shown, and peak current 304 may depend on the supply voltage 302 (Vcc) level as shown below in Table 1. As shown, the peak current 306 may reach 130 mA with a width of about 10 microseconds.

TABLE 1

Peak Current vs. Supply Voltage

| Vcc | Peak Current | Reading Range |
|---|---|---|
| 3.6 V | 130 mA | 4.3 cm |
| 3.3 V | 118 mA | 4.3 cm |
| 3.0 V | 104 mA | 3.7 cm |
| 2.7 V | 104 mA | 3.7 cm |

As shown in Table 1, larger supply voltage Vcc values correlate to increased peak current and device reading range (e.g., the distance at which the device 104 may read the payment device 106 in FIG. 1). A reduced peak current may result in a reduced reading range.

Referring to FIG. 3B, the graph 350 shows electrical current peak duration when the power rail voltage optimization and damping circuit 208 of FIG. 2 is not in place (e.g., without damping). A supply voltage 352 is shown, and peak current 354 may depend on the supply voltage 352 (Vcc) level. Current 356 may be the current when a field is detected (e.g., the device 104 detects a field of the payment device 106 in FIG. 1). Current 358 may refer to the current when a device is polling at close range (e.g., when the device 104 polls the payment device 106 at close proximity after detecting the field). Current 359 may refer to the current when the device is polling at a longer range. The current 360 and/or the current 362 may refer to the current used in an NFC operation (e.g., when the NFC chip 204 of FIG. 2 sends the one or more near-field communications 112 of FIG. 1). The current 364 may be the current consumed by the secure element 222 of FIG. 2 at 12 mA. The supply voltage 352 may be reduced from the supply voltage 302 of FIG. 3A. The current 366 may refer to the current drop when the device is removed from the nearby field (e.g., indicating conclusion of an NFC operation).

Still referring to FIG. 3B, the supply voltage 352 may drop due to operations, such as transmissions using NFC. Voltage drops 368 represent example voltage drops sampled by the device and indicative of NFC operations.

Referring to FIG. 4A, the graph 400 shows a current profile of the graph 300 of FIG. 3A, but with the power rail voltage optimization and damping circuit 208 of FIG. 2 is in place. The graph 400 shows the peak current has been reduced in comparison to the graph 300 of FIG. 3A (e.g., due to damping).

Referring to FIG. 4B, the graph 450 shows a current profile during an NFC operation when the power rail voltage optimization and damping circuit 208 of FIG. 2 is in place, when the external antenna 226 of FIG. 2 is in place, and when input voltage has been reduced. A supply voltage 452 (e.g., associated with the ADC 216 of FIG. 2) is shown, and peak current 454 may depend on the supply voltage 452 (Vcc) level. The current 456 may be the current when the secure element 222 of FIG. 2 turns on. Current 458 and current 460 may be current when a NFC polling operation is performed at a longer range (e.g., a 30 ms interval with a width of about 220 us for the polling operation from the current 458 to the current 460). Current 462 and current 464 may refer to current when a NFC polling operation is performed at a shorter range (e.g., a 30 ms interval with a width of about 220 us for the polling operation that occurs from the current 462 to the current 464). Peak current 466 may refer to the longest current peak (e.g., about 13 ms). The current 468 may be the current consumption of the secure element 222 of FIG. 2 (e.g., at 12 mA). A NFC operation (e.g., a payment transaction) may occur during the interval 470 (e.g., about 280 ms).

Still referring to FIG. 4B, when the NFC operation occurs during the interval 470, the device (e.g., the device 104 of FIG. 1) may be using other operations of another communication protocol (e.g., Bluetooth). A Bluetooth transmission from the device, for example, may result in two current spikes (e.g., every 7.5 ms, one being about 364 us long and the other being about 126 us long). The current spikes may overlap with NFC operation current spikes during the interval 470, resulting in the total peak current being about 80 mA, which may be too high for the device and its power supply, and may result in a brownout. The current 470 may drop off when the NFC operations has concluded and the device has been remove from the nearby field.

Figure 5A:
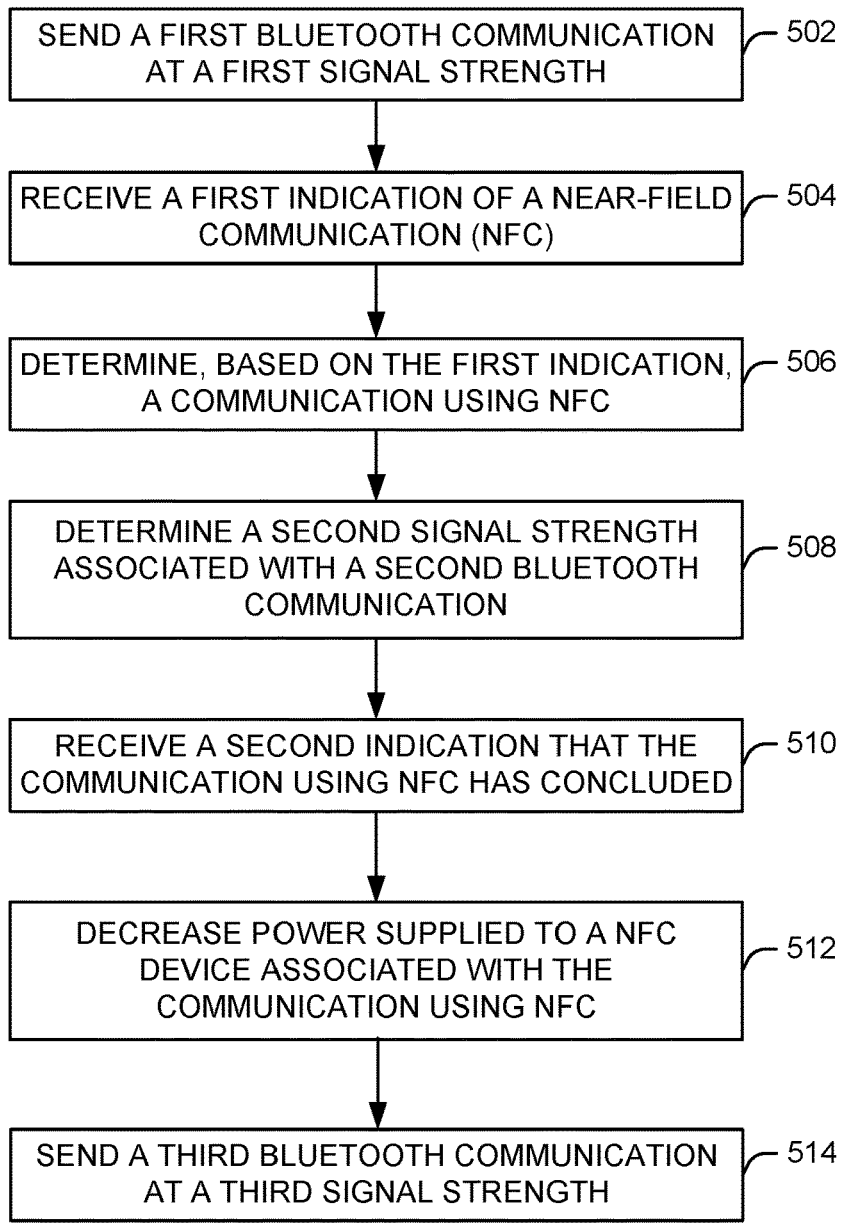
FIG. 5A illustrates a flow diagram for a process for using enhanced near-field communications for wireless devices, in accordance with one or more example embodiments of the present disclosure.

FIG. 5A illustrates a flow diagram for a process 500 for using enhanced near-field communications for wireless devices, in accordance with one or more example embodiments of the present disclosure.

At block 502, a device (e.g., the device 104 of FIG. 1 having the MCU 202 and the NFC chip 204 of FIG. 2) may send a first Bluetooth communication (e.g., the Bluetooth communication 110 of FIG. 1 using the MCU 202 of FIG. 2) at a first signal strength. The device may be in communication with another device (e.g., the payment device 106 and/or the device 108 of FIG. 1), and may be sending and/or receiving Bluetooth packets.

At block 504, the device may receive a first indication of a NFC communication (e.g., the near-field communications 112 of FIG. 1). An MCU (e.g., the MCU 202 of FIG. 2) may receive an indication from a NFC device (e.g., the NFC chip 204 of FIG. 2) indicating that the NFC device is performing a NFC operations (e.g., sending the near-field communications 112 of FIG. 1). The indication may be a detected voltage (e.g., the VDD power supply 230 of FIG. 2) associated with an element (e.g., the secure element 222 of FIG. 2) indicative of a NFC operation being performed by the NFC device, or may be a communication from the NFC device indicating that NFC operations are occurring. The indication may serve as an interrupt to the MCU of the device, allowing the MCU to enter a coexistence mode to facilitate concurrent Bluetooth and NFC operations without risk of a brownout. For example, the MCU of the device may detect the supply voltage level (e.g., the supply voltage level 452 of FIG. 4B) of the element indicative of the NFC operation (e.g., by sampling the voltage drop across the resistor 210 of FIG. 2 using the ADC 216 of FIG. 2).

At block 506, the device may determine, based on the first indication, that the NFC device is operating (e.g., sending and/or receiving NFC communications). The element may be powered only when an external magnetic field is detected by the NFC device, so the voltage may indicate that the NFC device has detected a nearby magnetic field and is initiating NFC operations.

At block 508, the device may determine a second signal strength with which to send a second Bluetooth communication. For example, the device may send additional Bluetooth communications at a reduced transmission power (e.g., when compared to the first Bluetooth communication at block 502), or may blank one or more Bluetooth transmissions (e.g., set transmission power to zero) when in the coexistence mode (e.g., during NFC operations as indicated by the presence of the indicator at block 504).

At block 510, the device may receive a second indication that the NFC communication has concluded. The second indication may be a signal sent by the NFC device to the MCU using an interface, or may be a detection that the voltage of block 506 (e.g., supplying the element) is no longer present (e.g., indicative that NFC operations have concluded because the NFC device is no longer drawing significant current for NFC operations). The second indication may be based on a set time to allow for NFC operations to conclude. For example, the MCU may wait a set time period after the first indication to allow for the NFC operation to conclude.

At block 512, the device may decrease power supplied to the NFC device that was used to perform NFC communications. The MCU may disable the NFC device, for example, once a NFC transaction has completed and the NFC device no longer detects a magnetic field, or the MCU may exit the coexistence mode and reduce power supplied to the NFC device. Alternatively, the MCU may disable itself.

At block 514, the device may send a Bluetooth communication at a third signal strength that may be the first signal strength (e.g., reinstating the first signal strength) or at another signal strength that is greater than the second signal strength. In this matter, the device may increase signal strength for communications after the NFC operation has concluded.

Figure 5B:
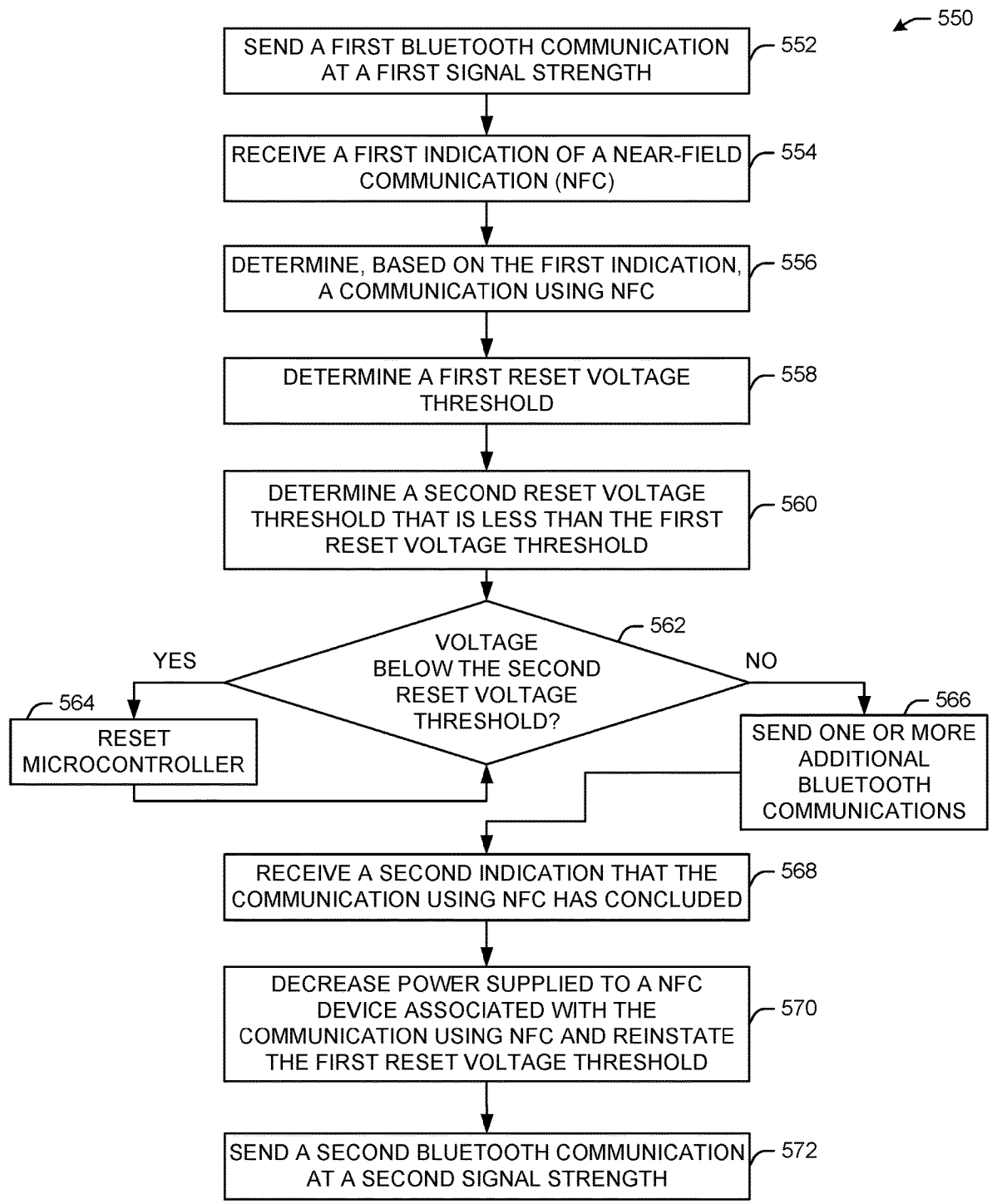
FIG. 5B illustrates a flow diagram for a process for using enhanced near-field communications for wireless devices, in accordance with one or more example embodiments of the present disclosure.

FIG. 5B illustrates a flow diagram for a process 550 for using enhanced near-field communications for wireless devices, in accordance with one or more example embodiments of the present disclosure.

At block 552, a device (e.g., the device 104 of FIG. 1 having the MCU 202 and the NFC chip 204 of FIG. 2) may send a first Bluetooth communication (e.g., the Bluetooth communication 110 of FIG. 1 using the MCU 202 of FIG. 2) at a first signal strength. The device may be in communication with another device (e.g., the payment device 106 and/or the device 108 of FIG. 1), and may be sending and/or receiving Bluetooth packets.

At block 554, the device may receive a first indication of a NFC communication (e.g., the near-field communications 112 of FIG. 1). An MCU (e.g., the MCU 202 of FIG. 2) may receive an indication from a NFC device (e.g., the NFC chip 204 of FIG. 2) indicating that the NFC device is performing a NFC operations (e.g., sending the near-field communications 112 of FIG. 1). The indication may be a detected voltage (e.g., the VDD power supply 230 of FIG. 2) associated with an element (e.g., the secure element 222 of FIG. 2) indicative of a NFC operation being performed by the NFC device, or may be a communication from the NFC device indicating that NFC operations are occurring. The indication may serve as an interrupt to the MCU of the device, allowing the MCU to enter a coexistence mode to facilitate concurrent Bluetooth and NFC operations without risk of a brownout. For example, the MCU of the device may detect the supply voltage level (e.g., the supply voltage level 452 of FIG. 4B) of the element indicative of the NFC operation (e.g., by sampling the voltage drop across the resistor 210 of FIG. 2 using the ADC 216 of FIG. 2).

At block 556, the device may determine, based on the first indication, that the NFC device is operating (e.g., sending and/or receiving NFC communications). The element may be powered only when an external magnetic field is detected by the NFC device, so the voltage may indicate that the NFC device has detected a nearby magnetic field and is initiating NFC operations.

At block 558, the device may determine a first reset power source voltage threshold for a power source of the device (e.g., the power source 232 of FIG. 2). For example, when the supply voltage for the device drops below the first reset power source voltage threshold, a brownout may occur. The MCU may be set the first reset power source voltage threshold (e.g., using an operating system) to protect against a brownout. The first reset power source voltage threshold may be set to protect Bluetooth transmission performance.

At block 560, the device may determine and set a second reset power source voltage threshold, which may be a reduced reset power source voltage threshold in comparison with the first reset power source voltage threshold. By reducing the reset power source voltage threshold, the device may risk some corruption to Bluetooth transmissions during a current spike caused by the concurrent Bluetooth and NFC operations of the device, but the Bluetooth link used for the Bluetooth communications may be maintained. The reduced reset power source voltage threshold may allow for the concurrent NFC and Bluetooth operations for a limited time (e.g., during NFC operations) because the MCU may not reset (e.g., as it might when using the first reset power source voltage threshold) when there is a voltage drop (e.g., across the resistor 210 of FIG. 2) caused by the concurrent NFC and Bluetooth operations. In this manner, the reset power source voltage threshold for the device may be set low enough to allow the concurrent NFC and Bluetooth operations for a few seconds, and then the device may reset the reset power source voltage threshold to the first reset power source voltage threshold once NFC operations have concluded.

At block 562, the device may determine (e.g., using the ADC 216 of FIG. 2) whether the voltage (e.g., across the resistor 210 of FIG. 2) is below the second reset power source voltage threshold. For example, the ADC 216 of FIG. 2 may be a 12-bit ADC that may sample the resistor 210 of FIG. 2 (e.g., indicative of a power supply to the NFC chip 204 of FIG. 2). When the resistor 210 is 4.7 ohms, for example, a 30 mA peak compared to an operating average 12 mA consumption of the NFC device may indicate a delta of 85 mV of voltage, which the ADC 216 may detect (e.g., using a sampling rate of 200 kHz). When the device detects a voltage that is below the second reset power source voltage threshold, the process 550 may continue at block 564, where the device may reset the MCU, and may return to block 562 to continue measuring voltage until the NFC operations have completed and the coexistence mode may terminate. When the voltage detected by the device is not below the second reset power source voltage threshold, the process 550 may continue at block 566, where the device may continue to send Bluetooth communications (e.g., the Bluetooth communications 114 of FIG. 1) concurrently with the NFC operations (e.g., at a reduced transmission rate, signal strength, or using blanking).

At block 568, the device may receive a second indication that the NFC communication has concluded. The second indication may be a signal sent by the NFC device to the MCU using an interface, or may be a detection that the voltage of block 556 (e.g., supplying the element) is no longer present (e.g., indicative that NFC operations have concluded because the NFC device is no longer drawing significant current for NFC operations). The second indication may be based on a set time to allow for NFC operations to conclude. For example, the MCU may wait a set time period after the first indication to allow for the NFC operation to conclude.

At block 570, the device may decrease power supplied to the NFC device that was used to perform NFC communications. The MCU may disable the NFC device, for example, once a NFC transaction has completed and the NFC device no longer detects a magnetic field, or the MCU may exit the coexistence mode and reduce power supplied to the NFC device. Alternatively, the MCU may disable itself. After NFC operations have concluded, the device may determine an increased Bluetooth transmission power to use in subsequent Bluetooth transmissions. The device may reinstate the first system reset power source voltage threshold to use when evaluating system voltage during subsequent transmissions.

At block 572, the device may send a second Bluetooth communication at a second signal strength that may be the first signal strength, or another signal strength that is greater than any reduce signal strength that may be used in transmissions at block 566.

Referring to FIGS. 5A and 5B, while the concurrent operations describe Bluetooth in combination with NFC, other communication methods may be applied. For example, Wi-Fi, ultrasound, long-term evolution (LTE), and other communication techniques using different protocols may be adjusted accordingly when used concurrently with NFC.

The descriptions herein are not meant to be limiting.

FIG. 6 illustrates a block diagram of an example of a machine 600 (e.g., the device 104 of FIG. 1, the payment device 106 of FIG. 1, the device 108 of FIG. 1) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632 (e.g., a battery or other power source, such as the power source 232 of FIG. 2), a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, the MCU 202 of FIG. 2, the NFC chip 204 of FIG. 2, a network interface device/transceiver 620 coupled to antenna(s) 630, and one or more sensors 628, such as a microphone, a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MIS0) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A method, comprising:
    sending, by a processor of a first device, a first Bluetooth communication at a first signal strength, wherein the first device is a battery-operated device;
    identifying, by a near field communication (NFC) device of the first device, a magnetic field, wherein the processor and the NFC device are collocated on the first device;
    determining, by the processor and based on the magnetic field, a first voltage associated with the NFC device;
    determining, by the processor and based on the first voltage, a communication between the NFC device and a second device, the communication using NFC;
    reducing, by the processor, based on the communication between the NFC device and the second device, the first signal strength to a non-zero value;
    determining, by the processor, a second voltage associated with the NFC device;
    determining, by the processor and based on the second voltage, that the communication using NFC has concluded; and
    decreasing a power supplied to the NFC device.

2. The method of claim 1, further comprising:
    determining, by the processor, a first reset battery voltage threshold associated with a battery of the first device; and
    determining, by the processor and based on the first voltage, a second reset battery voltage threshold associated with the battery of the first device, the second reset battery voltage threshold less than the first battery reset voltage threshold.

3. The method of claim 1, further comprising activating, by the NFC device and based on the identification of the magnetic field, a switch operatively connected to the NFC device and to the processor, wherein the first voltage is determined based on the activation of the switch.

4. The method of claim 1, wherein the first voltage is received by the processor using a communication interface between the processor and the NFC device.

5. A method, comprising:
    sending, by a processor of a first device, a first Bluetooth communication at a first signal strength;
    receiving, by the processor, a first indication of activity associated with a near field communication (NFC) device of the first device, wherein the processor and the NFC device are collocated on the first device;
    reducing, by the processor, based on the first indication of activity associated with the NFC device, the first signal strength to a non-zero value;
    receiving, by the processor, a second indication that the activity associated with the NFC device has concluded; and
    decreasing a power supplied to the NFC device.

6. The method of claim 5, further comprising:
    determining, by the processor, a first reset voltage threshold associated with a power source of the first device; and
    determining, by the processor and based on the first indication of activity, a second reset voltage threshold associated with the power source of the first device, the second reset voltage threshold less than the first reset voltage threshold.

7. The method of claim 5, further comprising:
    determining a voltage drop across a resistor associated with the NFC device, wherein a second signal strength based on the reduction of the first signal strength is based on the voltage drop; and
    deactivating a Bluetooth transmission chain associated with the first Bluetooth communication.

8. The method of claim 5, wherein the first indication of activity is based on a voltage drop.

9. The method of claim 8, wherein an indication of the voltage drop is detected by the processor based on activation of a switch.

10. The method of claim 8, wherein an indication of the voltage drop is received by the processor using a communication interface between the processor and the NFC device.

11. The method of claim 5, further comprising:
    identifying, by the NFC device, a magnetic field; and activating, by the NFC device and based on the identification of the magnetic field, a switch operatively connected to the NFC device and to the processor, wherein the first indication of activity is determined based on the activation of the switch.

12. The method of claim 5, wherein decreasing the power supplied to the NFC device comprises disabling the NFC device based on the second indication.

13. The method of claim 5, wherein the activity is associated with the NFC device is associated with a purchase transaction.

14. The method of claim 5, wherein the first device is a wearable device.

15. The method of claim 5, further comprising increasing the first signal strength to use with a third Bluetooth communication.

16. A device comprising:
    a processor device coupled to memory; and
    a near field communication (NFC) device coupled to the memory, the processor device configured to:
    send a first communication using a first communication technique at a first signal strength;
    receive a first indication of activity associated with the NFC device, the first communication technique different than NFC;
    reduce, based on the first indication of activity associated with the NFC device, the first signal strength to a non-zero value;
    receive a second indication that the activity associated with the NFC device has concluded; and
    decrease a power supplied to the NFC device.

17. The device of claim 16, wherein the processor device is further configured to:
    determine a first reset voltage threshold associated with a power source of the processor device; and
    determine, based on the first indication of activity, a second reset voltage threshold associated with the power source of the processor device, the second reset voltage threshold less than the first reset voltage threshold.

18. The device of claim 16, wherein the processor device is further configured to:
    determine a voltage drop across a resistor associated with the NFC device, wherein a second signal strength based on the reduction of the first signal strength is based on the voltage drop; and
    deactivate a transmission chain associated with the first communication.

19. The device of claim 16, wherein the processor device is further configured to determine a first voltage associated with the NFC device, wherein the first indication of activity is based on the first voltage.

20. The device of claim 16, wherein the first indication of activity is received by the processor device based on activation of a switch or by using a communication interface between the processor device and the NFC device.

* * * * *